(12) United States Patent
Bohrn

(10) Patent No.: US 11,917,032 B2
(45) Date of Patent: Feb. 27, 2024

(54) CONTENT DELIVERY SYSTEM

(71) Applicant: MO-DV, INC., Campbell, CA (US)

(72) Inventor: Greg Bohrn, Campbell, CA (US)

(73) Assignee: MO-DV, INC., Campbell, CA (US)

( * ) Notice: Subject to any disclaimer, the term of this patent is extended or adjusted under 35 U.S.C. 154(b) by 0 days.

(21) Appl. No.: 16/884,959

(22) Filed: May 27, 2020

(65) Prior Publication Data

US 2021/0051212 A1    Feb. 18, 2021

Related U.S. Application Data

(60) Provisional application No. 62/884,093, filed on Aug. 7, 2019.

(51) Int. Cl.
*H04L 67/568* (2022.01)
*H04L 9/40* (2022.01)
*H04L 67/02* (2022.01)
*H04L 67/141* (2022.01)

(52) U.S. Cl.
CPC ........ *H04L 67/568* (2022.05); *H04L 63/0876* (2013.01); *H04L 67/02* (2013.01); *H04L 67/141* (2013.01)

(58) Field of Classification Search
None
See application file for complete search history.

(56) References Cited

U.S. PATENT DOCUMENTS 7,822,876 B1 * 10/2010 Kramer .............. H04L 63/1441
                                                              709/248
8,751,795 B2    6/2014 Widergren et al.
9,197,696 B1 * 11/2015 Jakatdar ................ H04L 67/10
10,015,312 B1 *  7/2018 Pan ........................ H04W 48/18
(Continued)

FOREIGN PATENT DOCUMENTS

WO    2016130715 A1    8/2016

OTHER PUBLICATIONS

Bello et al. "Network layer inter-operation of Device-to-Device communication technologies in 1-20Internet of Things (IoT)." In: Ad Hoc Networks. Jun. 20, 2016 (Jun. 20, 2016) Retrieved on Aug. 11, 2020 (Aug. 11, 2020) from <https://fardapaper.ir/mohavaha/uploads/2017/09/Network-layer-inter-operation-of-Device-to-Device-communication.pdf> entire document.
(Continued)

*Primary Examiner* — Quang N Nguyen
(74) *Attorney, Agent, or Firm* — Womble Bond Dickinson (US) LLP

(57) ABSTRACT

A content delivery platform and method for using the same are disclosed. In one embodiment, the content delivery platform comprises one or more client devices, each of the one or more client devices having memory for storing an application and one or more processors to execute the application; and a first device having a physically local content cache to store content to be served directly to the one or more client devices, each of the one or more client devices, in response to executing the application with the one or more processors, operable to: automatically detect presence of the first device; automatically connect to the first device; request content from the first device; obtain the content from the first device; and disconnect from the first device after receiving the content from the first device.

20 Claims, 6 Drawing Sheets

(56) References Cited

U.S. PATENT DOCUMENTS

| | | | |
|---|---|---|---|
| 10,104,046 B2 | 10/2018 | Boliek et al. | |
| 11,128,621 B2* | 9/2021 | Liang | H04L 67/02 |
| 2004/0218749 A1 | 11/2004 | Shaffer et al. | |
| 2007/0028009 A1 | 2/2007 | Robbin et al. | |
| 2008/0288106 A1 | 11/2008 | Widergren et al. | |
| 2012/0005265 A1* | 1/2012 | Ushioda | H04L 12/2812 |
| | | | 709/203 |
| 2012/0202185 A1* | 8/2012 | Jabara | G09B 5/06 |
| | | | 434/350 |
| 2014/0108844 A1* | 4/2014 | Lee | H04W 52/0254 |
| | | | 713/323 |
| 2015/0245108 A1* | 8/2015 | Pfeffer | H04N 21/26241 |
| | | | 725/96 |
| 2016/0029294 A1* | 1/2016 | Kim | H04W 52/283 |
| | | | 455/456.3 |
| 2016/0241893 A1* | 8/2016 | Allhands | H04N 21/4345 |
| 2016/0295379 A1* | 10/2016 | Jakatdar | H04L 67/141 |
| 2016/0371099 A1* | 12/2016 | Woog | H04L 67/24 |
| 2017/0245128 A1* | 8/2017 | Cronholm | G06F 3/04883 |
| 2017/0331885 A1* | 11/2017 | Jakatdar | G06F 16/9574 |
| 2018/0039430 A1* | 2/2018 | Wong | G06F 3/0617 |
| 2019/0215327 A1* | 7/2019 | Murthy | H04L 63/107 |

OTHER PUBLICATIONS

International Preliminary Search Report and Written Opinion received for PCT Application No. PCT/US2020/039021, dated Oct. 6, 2020, 11 pages.

International Preliminary Report and Written Opinion on the Patentability of Application No. PCT/US2020/039021 dated Feb. 17, 2022, 10 pages.

European Search Opinion for European Patent Application No. 20850194.0, dated Jul. 11, 2023, 4 pages.

Supplementary European Search Report for European Patent Application No. 20850194.0, dated Jul. 11, 2023, 2 pages.

* cited by examiner

CONTENT DELIVERY SYSTEM

RELATED APPLICATION

The present application claims the benefit under 35 USC 119(e) of U.S. Provisional Patent Application No: 62/884,093, filed on Aug. 7, 2019 and entitled "CONTENT DELIVERY SYSTEM", which is incorporated by reference in its entirety.

FIELD OF THE INVENTION

Embodiments of the invention generally relate to the field of content delivery via networked download to a local content cache with fast local transfer to client devices.

BACKGROUND

Delivery of large digital content, such as video, via the Internet has improved as a result of huge investments from large networking companies. The backbone of the Internet, the high bandwidth dedicated connections between data centers, has increased bandwidth within the cloud significantly. Also, large content caching data centers located at the "edge" of the Internet bring the content closer to many client devices (users). However, one problem with content delivery is the "last mile", serving the network between the Internet Service Provider (ISP) and the client device. Some improvement has been made here with cable television wiring converted to ISP service, 4G cellular towers, and, in some cases, fiber optic wiring. However, the demand for content delivery has outstripped even these investments.

One challenge is how to get the content closer still to the client devices so there is less need for expensive networking in that last mile. This is challenge addressed by the techniques disclosed herein.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

SUMMARY OF THE INVENTION

The Content Delivery System delivers content quickly and securely between a client device and a pre-loaded content caching device or network. In other words, the Content Delivery System delivers large digital content to a mobile device quickly with little delay. This system is ideal for delivering video and other multimedia content that is both large and often viewed on mobile devices.

In one embodiment, Content Delivery System consists of three or more software components running on different types of hardware. Two of the basic components include a Content Access Point, which is a local content repository with a wireless access point and a Client Application (Client App) that interacts with the Content Access Point to initiate the download. In some embodiments, a third component, the Dedicated Web Services service, provides both Client App authorization and/or Content Access Point content management.

In one embodiment, the Content Access Point contains content data either locally in cache memory or accessible over a Local Area Network (LAN). The Content Access Point has the ability to connect with the mobile device. In some embodiments, the Content Access Point offers a high-speed wireless connections, such as, for example, but not limited to, Wi-Fi. With content stored locally and a high-speed connection, content can be transferred with little or no delay and at high-speed. The Content Access Point is also able, through variety of different embodiments, to determine for which content a given Client App is authorized to download.

Figure 2:
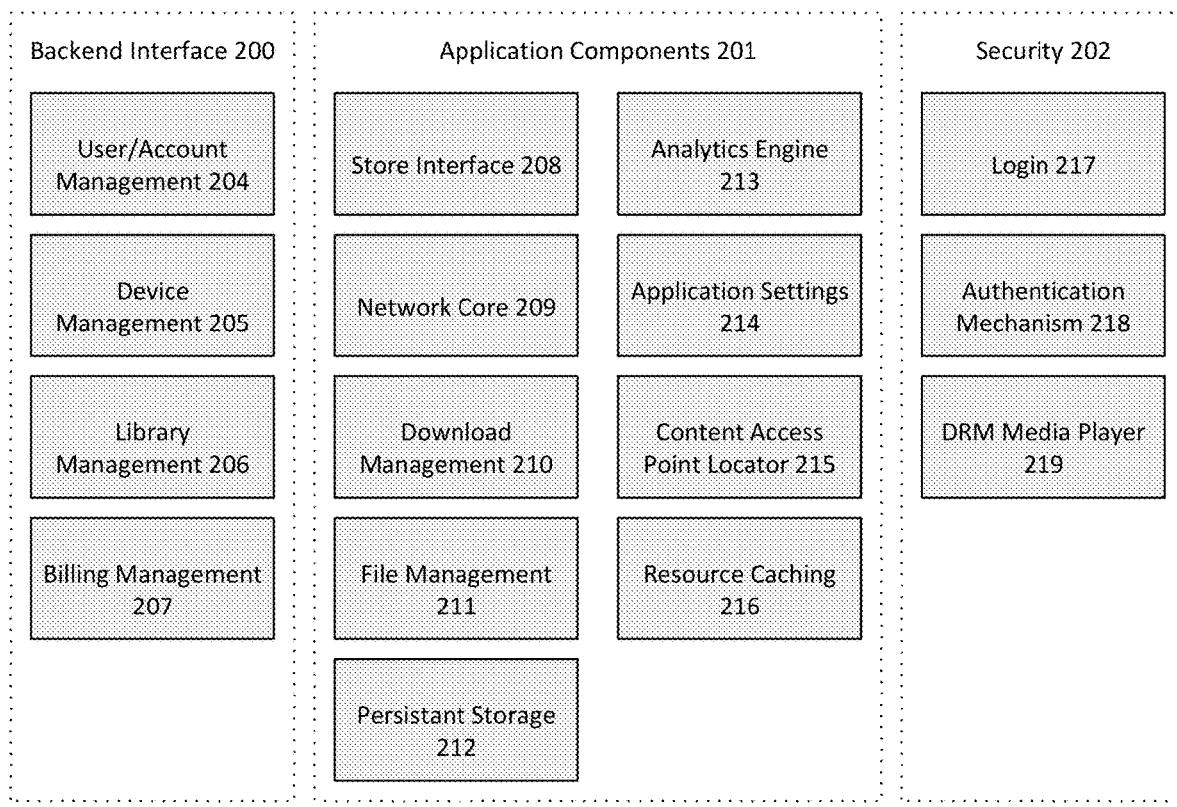
FIG. 2 is a block diagram of one embodiment of the software that runs on client devices, referred to herein as Clients.

The Client App is an application on a client device (e.g., a mobile device) and performs its functions when launched or controlled by the user. The Client App is responsible for initiating the content download. In embodiments using wireless connections, the Client App detects the presence of Content Access Point, connects to that Content Access Point (e.g., wirelessly connects), requests content, and receives the downloaded content. In one embodiment, are many variants of Client that run on corresponding variants of client devices, such as Android, iOS, and more. In one embodiment, this client software interacts with a dedicated web service (Dedicated Web Services) to create accounts, register devices, and perform transactions to get authorization for content. In one embodiment, the Dedicated Web Services also wirelessly connects with Content Access Points to transfer pre-authorized content (and, in some embodiments, other functions, see below). Although this software is implemented using different languages and libraries, in accordance with the type of devices on which the software runs, all the variations of client software perform the same functions (e.g., functions such as shown in FIG. 2). Furthermore, in one embodiment, the Client software is compatible with the software connections in the Content Access Point and Dedicated Web Services (for example, discovery, HTTP, and API calls).

Figure 3:
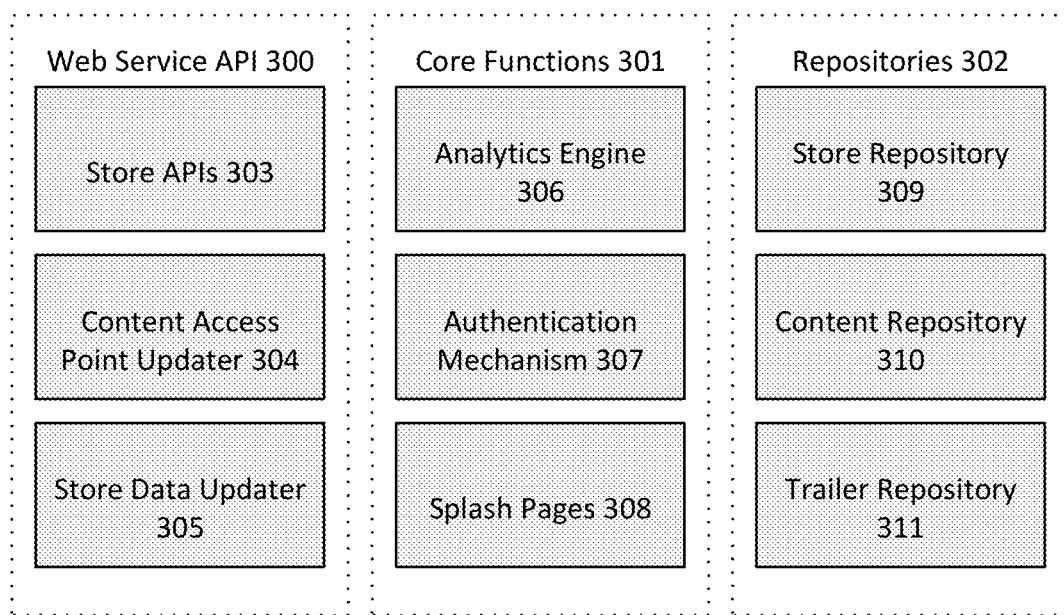
FIG. 3 is a block diagram of the software that runs on kiosk devices, referred to herein as Content Access Points.

In one embodiment, the Content Access Point runs on a kiosk device or on a networking device. In one embodiment, a Content Access Point is a physical device, like an information kiosk, with signage. In one embodiment, the Content Access Point has a user interface consisting of one, or more, of the following components: a display screen, a pointing method or device, and a keyboard. In one embodiment, user can interact with the Content Access Point interface in a similar way as with a Client, creating accounts, registering devices, and performing transactions. This software is implemented using different languages and libraries, in accordance with the type of Content Access Point devices on which the software runs, all the variations of Content Access Point software perform the same functions as shown in FIG. 3. Furthermore, in one embodiment, all of the client software is compatible with the software connections in the Client and Dedicated Web Services (for example, discovery, HTTP, and API calls).

In one embodiment, a Content Access Point is one, or more, dedicated Wi-Fi signals from a Wi-Fi access point that can be detected by the Client software and device. Thus, Content Access Points can be Wi-Fi networks without a user-oriented physical presence. In some embodiments, signage and a physical object are used to denote the location of a Content Access Point is optional.

In one embodiment, a Content Access Point also acts as a proxy network to access the Dedicated Web Services software and servers. In this embodiment, the Content Access Point is behaving as a Wi-Fi access point.

In one embodiment, a Content Access Point is temporarily not connected to the Dedicated Web Services and performs operations with the Client (e.g., creating accounts, registering devices, transactions) which are stored and later transferred to Dedicated Web Services when a connection is reestablished.

In one embodiment, a Content Access Point is connected to the Dedicated Web Services only when an appropriate wired or wireless connection becomes available. For example, if there is a bus, delivery truck, or other schedule service that comes and connects to the Content Access Point, then at that time, all the appropriate content would be downloaded to the Content Access Point and all the appropriate data (e.g., analytics, client interactions, etc.) would be uploaded.

In one embodiment, a Content Access Point is connected to the Dedicated Web Services constantly with an appropriate Internet connection. Content can be downloaded at any time to the Content Access Point, although the Dedicated Web Services servers might choose a time when the available bandwidth is better, or potentially optimal. In one embodiment, the client data is uploaded continually.

Figure 4:
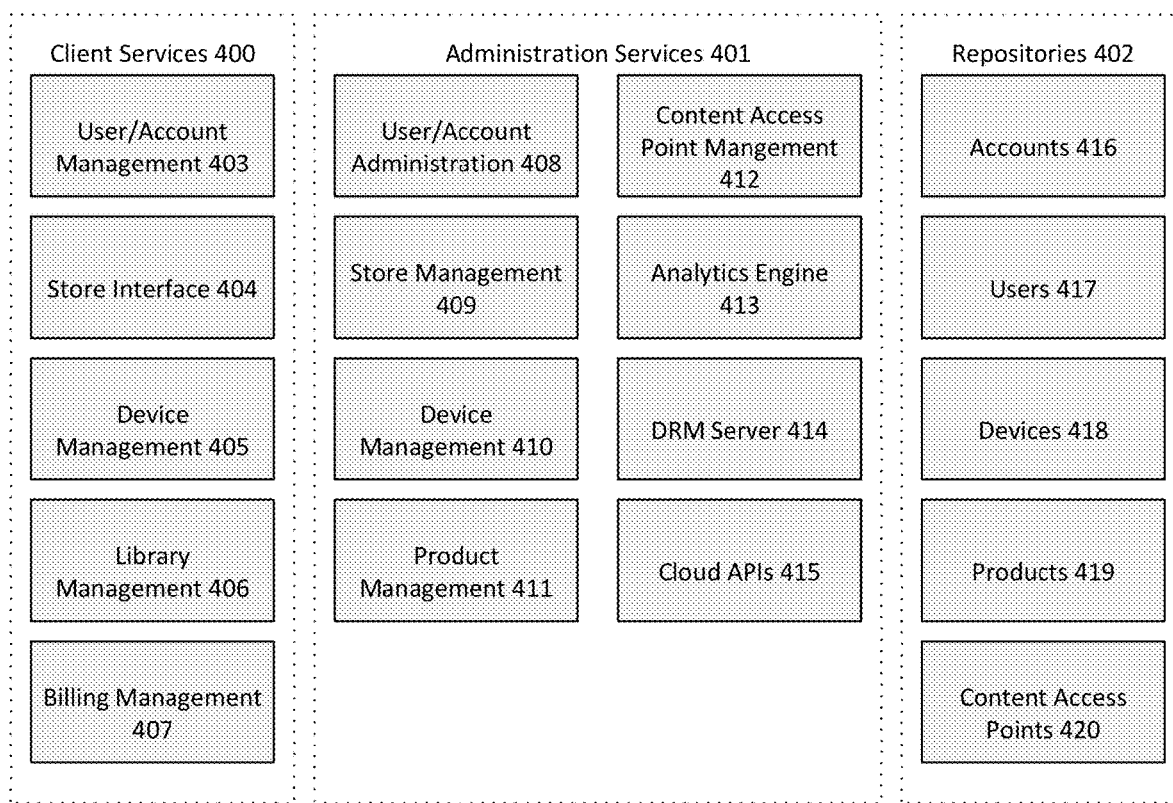
FIG. 4 is a block diagram of one embodiment of the software that runs web services and websites on servers in the cloud, referred to herein as Dedicated Web Services servers.
Figure 5:
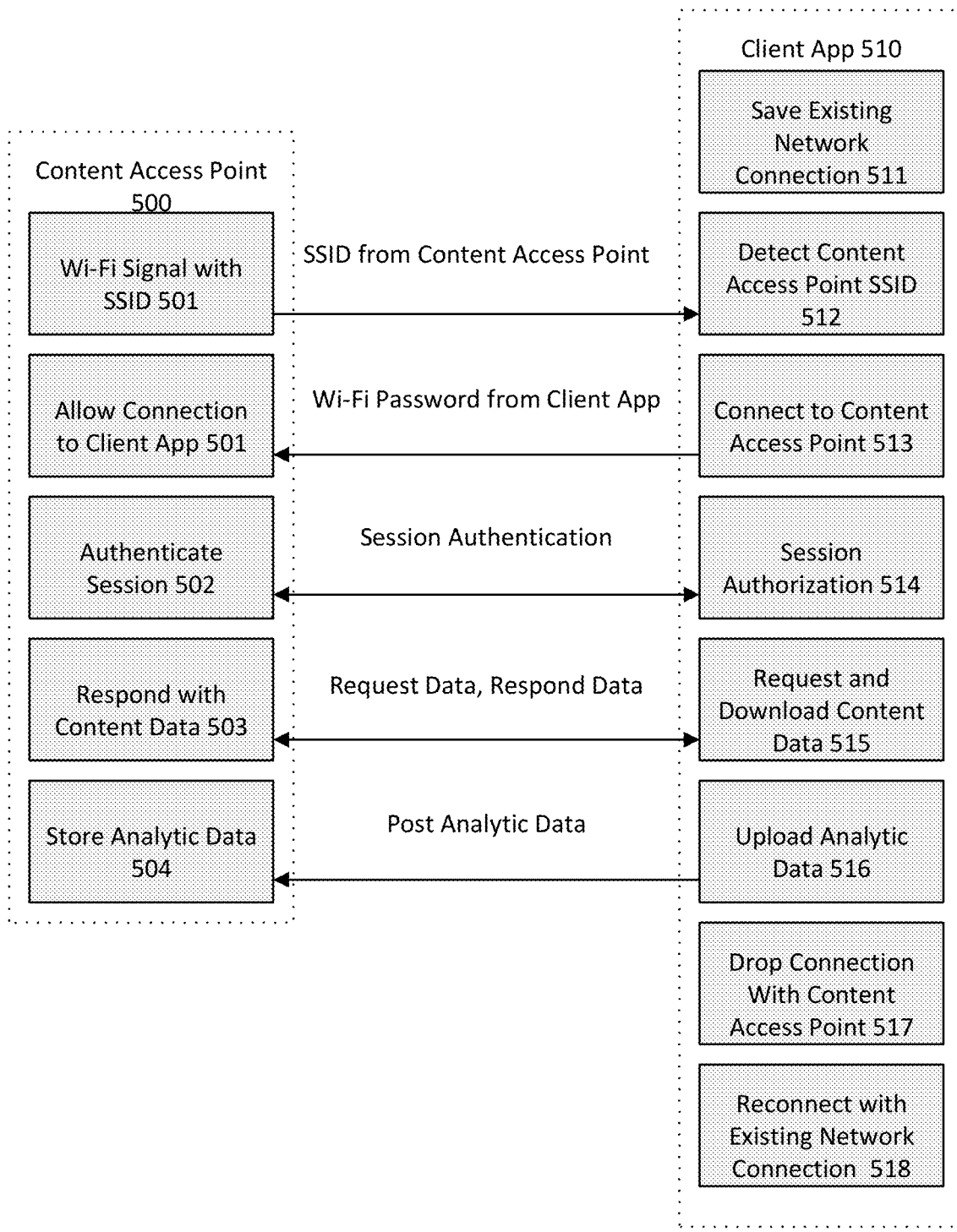
FIG. 5 is a communication diagram of an example interaction between a Content Access Point and a client application.

In one embodiment, the Dedicated Web Services runs on cloud servers and performs the backend functions described below. This system serves many client devices and pre-loads and orchestrates the behavior of many Content Access Point devices or networks. This software is implemented using different languages and libraries, in accordance with the type of web servers on which the software runs, all the variations of Web software perform the same functions as shown in FIG. 4. Furthermore, in one embodiment, the client software is compatible with the software connections in the Client and Content Access Point (for example, discovery, HTTP, and API calls).

Definitions

For purposes herein, the Content Delivery System is the software and hardware used to implement the client device transaction, authentication, and content download.

A client device is most commonly a computer, laptop computer, tablet, or mobile phone device but is not limited to being these devices. However, the techniques described herein are not limited to the type of client device served. For example, set-top television boxes, digital video recorders, smart watches, and Internet of Things (IoT) devices could all be served by the Content Delivery System.

A pre-loaded content caching device or network, hereafter referred to herein by the term Content Access Point, is a physical device or network that has memory for storing content (e.g., video content). The Content Access Point also has wireless connectivity (e.g., Wi-Fi) and software to connect to the client device and transfer content. In one embodiment, a Content Access Point is part of a physically identifiable apparatus or signage that allows users to identify the location. In one embodiment, a Content Access Point is a wireless network to which the client device can automatically connect. Finally, the Content Access Point has one, or more, methods for preloading content (e.g., download from the Internet, side-loaded from a similar device, or loaded by a courier, etc.). In one embodiment, Content Access Points are kiosks referred to in "Content Distribution Systems and Methods," U.S. Pat. No. 10,104,046 B2. Dedicated Web Services is the software and network server combination that perform all of the backend cloud functions.

Client is the application running on the client device that initiates and receives pre-authorized content. On some client devices, the content selection transaction can also be performed. On other devices, the content authorization is implied by secure registration of the device. In this case, the content selection occurs outside of the Client.

Digital Rights Management (DRM) is an encryption technique commonly used to secure content such as videos.

CRUD is an acronym referring to the common software data operations of Create, Read, Update, and Delete.

Content usually comprises video data. However, any type of data can be used. In one embodiment, the Content Delivery System protects, tracks, ensures usage rules, and provides analytics using the technology found in U.S. Pat. No. 8,751,795 B2, "Secure Transfer and Tracking of Data Using Removable Non-volatile Memory Devices".

Content Delivery System Data Flow

Figure 1:
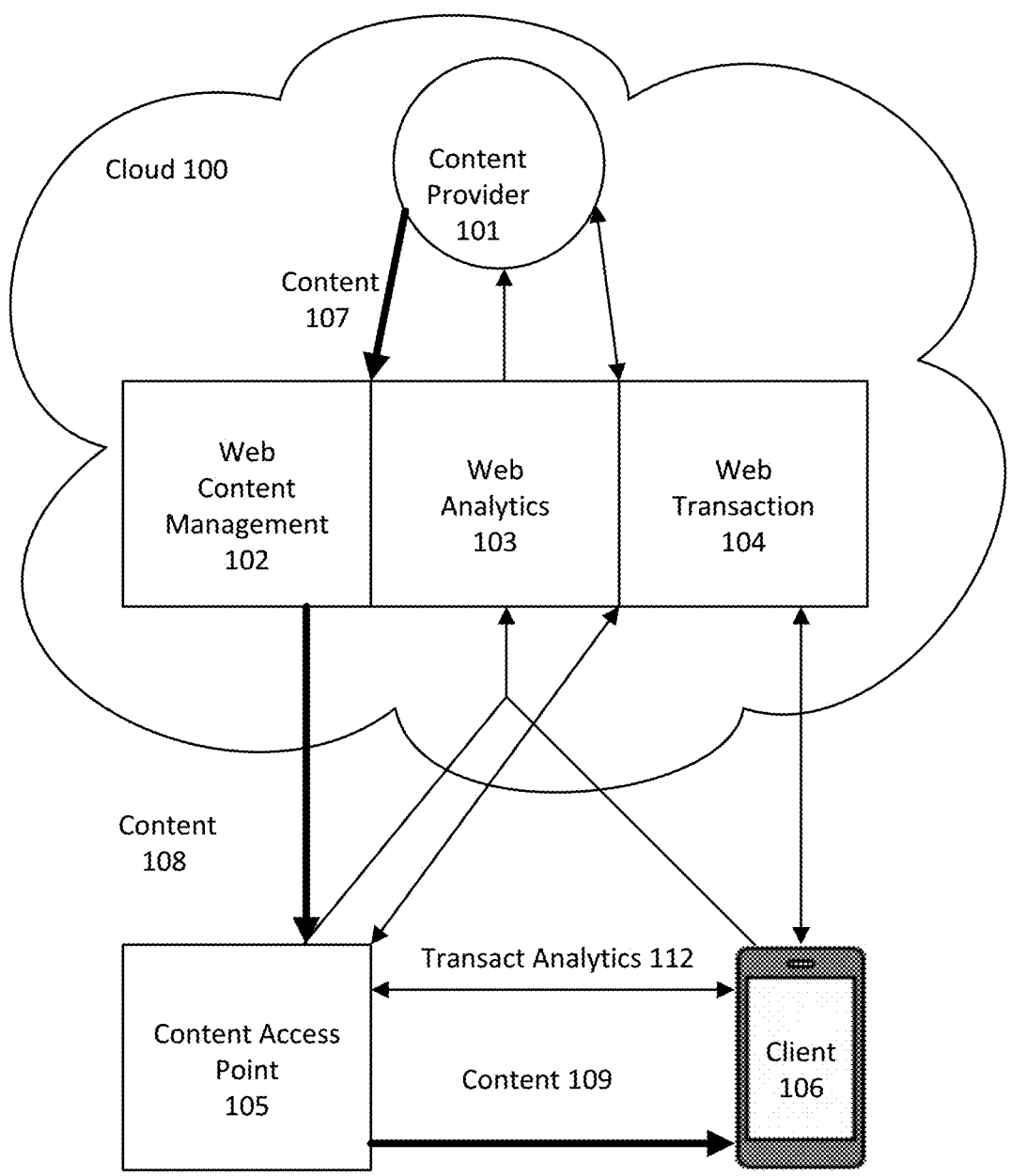
FIG. 1 is a block diagram of one embodiment of a system and defines the three independent pieces of software of the system.

FIG. 1 shows the relationship between the components of Content Delivery System. Referring to FIG. 1, the Cloud 100 includes backend services for Dedicated Web Services modules and any associated servers, such as the content servers from a Content Provider 101.

In FIG. 1, three functions of Dedicated Web Services are identified. These are described I more detail below. Specifically, Dedicated Web Services Content Management 102 module handles the content data flow from the Content Provider 101 to one, or more, Content Access Points 105. Note that only one Content Access Point 105 is shown to avoid obscuring the teachings disclosed herein. In one embodiment, the content is preloaded by instruction from the Dedicated Web Services Content Management module 102 onto the Content Access Points 105. In one embodiment, the Dedicated Web Services Content Management module 102 responds to a request from the Content Access Points 105 for content.

In one embodiment, the Dedicated Web Services Content Management module 102 manages content data storage directly. In one embodiment, the Dedicated Web Services Content Management module 102 acts as a proxy server for the Content Provider 101 data storage.

FIG. 1 shows the communication channel of the Content Access Point 105 and the Client 106. In one embodiment, the Client 106 automatically detects and connects to the Content Access Point 105 and transfer authorized content.

FIG. 1 shows the flow of the content from the Content Provider 101 to the Dedicated Web Services Content Management module 102 via the Content communication channel 107 (e.g., wireless connection, wired connection, etc.), then from the Dedicated Web Services Content Management module 102 to the Content Access Point 105 via Content communication channel 108, and finally from Content Access Point 105 to the Client 106 via Content communication channel 109 (e.g., wireless connection, wired connection, etc.).

In one embodiment where the Content Access Point 105 is preloaded with content, the content is passed at different (asynchronous) times, first to the Content Access Point 105 and later to the Client 106.

In one embodiment where the Client 106 requests content that has not been preloaded onto Content Access Point 105, the content data flows from the Content Provider 107 (or the Dedicated Web Services Content Management module 102 if it is the data storage) to the Content Access Point 105 to the Client 106 in relatively the same time, similar to streaming.

Two other functions are shown on FIG. 1. The Dedicated Web Services Analytics module 103 receives and process analytics signals from the Content Access Point 105 and Client 106.

Also there is bidirectional communication between the Dedicated Web Services Transaction module 104 and the Client 105 that is used for shopping for content, purchasing content, and receiving authorization.

There is a similar bidirectional communication between the Client 106 and the Content Access Point 105 via the Transact Analytics 112 communication channel (e.g., wireless connection, wired connection, etc.). If there is no network connection between the Client 106 and either the Dedicated Web Services Transaction module 104 or the Dedicated Web Services Analytics module 103, the Client 106 uses the Transact Analytics communication channel 112 for these functions.

Content Delivery System Value and Usage

Embodiments of the Content Delivery System have significant value for users, content providers, and network providers. This is important because all three of these stakeholders participate in content delivery.

Value for users include:
fast—two hour high definition video in under a minute,
good viewing experience—low latency, no buffering, no interruptions,
convenience—seamless automatic download, no Internet connection required,
great for airports, trains, buses, bookstores, stores, malls, gas stations, etc.

Value for content providers (Netflix, Amazon, Apple, Hulu, etc.) include:
reach untapped users globally—majority of the world without sufficient bandwidth,
secure—Digital Rights Management (DRM) for content,
analytics—know downloading, playing, and deleting behavior,
versatile—supports diverse content, sizes, and formats (e.g., HD, HDX, UHD/4K, 8K, etc.).

Value for network and Internet Service Providers (ISP) (e.g., Comcast, AT&T, Verizon, etc.) include:
new content delivery channel—potential new revenue source,
offload video demand burden from mobile devices,
inexpensive Content Access Point deployment.

Content includes, but is not limited to, movies, television, video games, health records, financial records, personnel records, training videos, educational videos, sports.

Valuable places to use Content Delivery System include, but is not limited to, airplanes, airports, buses, bus stations, trains, train stations, hospitals, restaurants, cafes, stores, hotels, plazas, and public spaces.

Below is a description for embodiments of the Client software, the Content Access Point software, the Dedicated Web Services software, and other functions.

Client Application

The Client App is launched or controlled by the user. In some embodiments, the Client App only detects a Content Access Point (e.g., Content Access Point signals), requests content, and downloads content when in the foreground (via, for example, a user interface exposed to the user). In some embodiments, the Client App can perform these functions while in the background.

In embodiments using wireless connections, the Client App detects the presence of the Content Access Point. For example, in one embodiment, using Wi-Fi, the Client App detects the signal via the Service Set Identifier (SSID), connects to that signal, requests the content, and downloads the content data. In one embodiment, after the Client App downloads the content data, it disconnects with the Content Access Point. In one embodiment, after the Client App disconnects with the Content Access Point, it reconnects with the Wi-Fi signal to which it was previously connected, if any.

In one embodiment, the Client App is authorized for all, or specific, content in an interaction with the Content Access Point. In one embodiment, the Client App possesses a special code, or codes, that authorizes the download of any, or specific, content. In one embodiment, authentication of the Client App is achieved via digital certificate exchange. In one embodiment, the Client App presents a login and password to the Content Access Point.

In one embodiment, the Client App has authorization for specific content by a previous transaction (e.g., purchase, gift, exchange, etc.) and receives a coded receipt for that transaction (e.g., purchase, gift, exchange, etc.). In one embodiment, the operation of the Client App itself implies authorization for any, or specific, content. That is, installing the Client App requires a previous transaction (e.g., purchase) of any, or specific, content or a subscription to any, or specific, content. In one embodiment, the Client App is authorized with a limited use of download privileges (e.g., a one-use gift download, a specific preset number of downloads).

In one embodiment, the Client App can browse the content available on a Content Access Point and allow the user to select which content is requested for download. In one embodiment, when the Content Access Point has access to the Internet and acts as an Internet Access Point, the Client App can browse the web services for content and make transactions on the web. In one embodiment, the Client App can make transactions directly with the Content Access Point without an Internet connection. The transaction, including the exchange of credit information (e.g., credit card numbers), will be logged the next time the Content Access Point is "recharged," as described in more detail below.

In some embodiments, the Client App uploads analytical data to the Content Access Point when connected. This data might include information about which content was viewed, when, and other similar often video-related analytics.

Client Software

This component of the Client provides the user facing application for browsing, acquiring and playing media content (e.g., DRM Media Content) on a wide variety of mobile platforms.

In one embodiment, Client software is developed for specific device platforms (e.g., iOS Devices—iPhones, iPads, Android Devices—Tablets, Phones, Amazon devices, Windows Devices, Mac Laptops, Game consoles, Media devices (Roku, etc.), Smart TVs, etc.).

In one embodiment, the Client software comprises a variety of components from backend interfaces, security and core applications modules. These components are discussed below.

Referring to FIG. 2, the following is a description of modules in the Backend Interface 200 in one embodiment of the Client software.

Account/User Management 204

This is a Dedicated Web Services interface component that allows the user to perform the following tasks:
- Create a new account (with multiple users and devices per account)
- Create, view, update or delete a user from the account
- Display all users registered to this account
- View details for each user assigned to this account
- Assign privilege level per user on the account
- Set parental viewing settings on account users Device Management 205

This is a Dedicated Web Services interface component that allows the user to perform the following tasks:
- Delete devices from the account
- View information about all the devices registered to the account Library Management 206

This is a Dedicated Web Services interface component that allows the user to perform the following tasks:
- Display all licensed media (active rentals or purchased media) on device and in account
- Display rental/purchase history
- Identify expired media and remove from client
- Deletion of media from the client
- Request media to be downloaded to a specific device in the account Billing Management 207

This is a Dedicated Web Services interface component that allows the user to perform the following tasks:
- Create, view, update or delete a billing service option
- Display the billing options available
- Select a default billing option Referring to FIG. 2, the following is a description of the Client software modules in the Application Components 201.

Store Interface 208

This is an application component that allows the user to perform the following tasks:
- Browse the systems catalog to find media to rent or purchase
- Look up media by genre, title or other meaningful searching method
- Find media and display more details about it
- Provide media in a series of formats (for Movies SD, HD, HDX and 4K)

Network Core 209

This is an application component that provides infrastructure support and performs the following tasks:
- Get store data to populate the store interface
- Download licensed media content
- Acquire media license
- Acquire Client data (e.g., Account, User, Devices, Library, etc.) from Dedicated Web Services
- Communication and file acquisition from the device to either Content Access Points or Dedicated Web Services.
- Progressively download a file from a Content Access Point or Dedicated Web Services (partial download recovery)
- Upload analytics
- Download by range Download Management 210

This is an application component that provides infrastructure support and performs the following tasks:
- Queue for downloading media content
- Interface to view, update, or delete active or queued downloads File Management 211

This is an application component that provides infrastructure support and performs the following tasks:
- Manage retrieving files supporting the Store Page
- Manage the media content on the device including the metadata and support files
- Check device storage capacity to prevent retrieving media too large for local storage
- Remove file when unnecessary or requested removal by the user
- Clear the store cache on application exit Persistent Storage 212

This is an application component that provides infrastructure support and performs the following tasks:
- Storage mechanism for custom application options
- Secure storage for credentials Analytics Engine 213

This is an application component that provides infrastructure support and performs the following tasks:
- Collect usage and logging data from the user device Applications Settings 214

This is an application component that allows the user to perform the following tasks:
- Customize the look and feel of the client application
- Interact with persistent storage to retrieve or store application or security settings Content Access Point Locator 215

This is an application component that provides infrastructure support and performs the following tasks:
- Map interface for locating Content Access Points
- Set favorite Content Access Points
- Search for them in a geographic region near the user Resource Cache 216

This is an application component that provides infrastructure support and performs the following tasks:
- Component to manage metadata, images, etc.
- Make sure resources do not consume more than 80% of the system resources available Referring to FIG. 2, the following is a description of modules in the Security 202 section of one embodiment of the Client.

Login 217

This is a security component that allows the user to perform the following tasks:
- Login into the Client as well as the Content Delivery System
- Uniquely identify the device being used to access the system
- Uniquely identify the user logging into the account Authentication Mechanism 218

This is a security component that allows the user to perform the following tasks:
- Secure channel (SSL, TLS, etc.) with Dedicated Web Services or with Content Access Point
- Register the device in the user's account
- Authenticate with the Dedicated Web Services and Content Access Point
- Access the purchase and acquisition process DRM Media Player 219

This is a security component that allows the user to perform the following tasks:
- Play the downloaded secure media
- Step forward, Step backwards, Stop, Pause and Play
- Counter to track media progress
- Full-screen capacity
- Hide the control when not actively being used
- Store license data for media files Content Access Point Description A Content Access Point is a physical device that can be found in many locations. In one embodiment, a Content Access Point comprises content storage, a Wi-Fi access point to which Client Apps can connect, and computation for content management, client authentication, analytics collection, and "recharge management."

Recharge management refers to herein the pre-loading, re-loading, and updating of content. It also includes the transfer of analytic and transactional data received from the Client Apps that have interacted with the Content Access Point. Finally, recharge management includes updating any list of authorization information (e.g., authorization codes) required for the Client Apps to connect to the Content Access Point.

Recharge can be performed in many different ways. In one embodiment, the Content Access Point is communicably connected to a web service via Ethernet or other wired networking. In one embodiment, the Content Access Point is communicably connected to a web service via Wi-Fi or other wireless networking. In one embodiment, the Content Access Point is communicably connected to a Wi-Fi mesh network. In each of these embodiments, the web service recharges the Content Access Point directly. The web service may continually add or delete content data from the Content Access Point based on one or more algorithms. In one embodiment, at least one of the algorithms predicts local demand for the content. Alternatively, the web service may queue changes for a time when bandwidth is available, such as, for example, off-peak early morning hours.

In one embodiment, the Content Access Point is recharged via addition of physical memory containing the new content. In one embodiment, the Content Access Point is recharged via the swapping of physical memory containing the new content. In one embodiment, the swapped out physical memory includes analytic and/or transactional data that is obtained from the Content Access Point when the physical memory is coupled to the Content Access Point, where the analytic and/or transactional data is obtained Client devices when connected to the Content Access Point. In one embodiment, the Content Access Point is recharged via the swapping of one "disk" in a Redundant Array of Independent Disks (RAID) configuration of memory. The software in this embodiment recognizes the new disk is the "correct" disk and copies the content to the old disks—the opposite of a typical RAID function.

In one embodiment, the Content Access Point is recharged via a portable storage device that is temporarily connected to the Content Access Point. In one embodiment, the portable storage device is connected to the Content Access Point via a wired connector, e.g., USB or Ethernet. In one embodiment, the portable storage device is connected to the Content Access Point via a wireless connection (e.g., Bluetooth, Wi-Fi, etc.).

When connected, the Content Access Point downloads all of the new content data and deletes any content required. In one embodiment, the portable storage device includes instructions for which old content to delete. In one embodiment, the portable storage device uploads the analytic and transactional information from the Content Access Point. Later, the portable storage device is connected to another device (e.g., a master device) that controls all of the content, transactions, and analytics. In one embodiment, this master device is an Internet web service.

A typical transaction between a Content Access Point and a Client App is described below.

Content Access Point

This component of Content Delivery System provides a variety of services in supporting Content Access Point delivery of licensed media to the end clients. These components are discussed below.

Referring to FIG. 3, the following is a description of software modules in the Web Service API 300 in one embodiment of the Content Access Point.

Store APIs 303

This is a web services API component which provides access for the following tasks:
- Interface to request metadata to populate the store
- Interface to request the stores catalog and store's layout instructions
- Interface to request download of media the user has a license to.

Content Access Point Updater 304

This is an updater services component that performs the following tasks:
- Download new updates to the Content Access Point services
- Ability to install, uninstall, start and stop the Content Access Point services on the Content Access Point device
- Heartbeat check in with Dedicated Web Services
- Ability to update the Updater Service Store Data Updater 305

This is an updater services component that performs the following tasks:
- Check Dedicated Web Services for new media packages per the Content Access Point
- Download, add, update or remove current media packages located on the Content Access Point
- Check for a new catalog or store layout files to update the Content Access Point and clients Referring to FIG. 3, the following is a description of software modules in the Core Functions 301 in one embodiment of the Content Access Point.

Analytics Engine 306

This is a core functions component and performs the following tasks:
- Collect usage and logging data from the user device Authentication Mechanism 307

This is a core functions component and performs the following tasks:
- Authentication functionality with Dedicated Web Services and pass through authentication via clients
- Content Access Point authentication to Dedicated Web Services for purpose of getting DRM media content and additional data for intermediate storage Splash Pages 308

This is a core functions component and performs the following tasks:
- Introductory page about the Content Access Point in the event someone opens a browser while connected to the Content Access Point router
- Links to the client stores to download the app (should pass through when linking to client stores)

Referring to FIG. 3, the following is a description of software modules in the Repositories 302 in the Content Access Point.

Store Repository 309

This is a repository component which performs the following tasks:
- Stores store data on store page layout in the client device
- Stores media metadata and images for use in the store interface on the client
- Stores the Content Access Point's catalog which tracks the inventory of the Content Access Point.

Content Repository 310

This is a repository component which performs the following tasks:
- Storage of DRM media content available for download or streaming as listed in the Content Access Point's catalog.

Trailer Repository 311

This is a repository component which performs the following tasks:
- Storage of media trailer available for streaming as listed in the Content Access Point's catalog.

Dedicated Web Services

This section is an overview of Dedicated Web Services functionality which supports the cloud level of one embodiment of a Content Delivery System. Referring to FIG. 4, the following is a description of one embodiment of software modules in the Client Services 400 in the Dedicated Web Services software modules in the Client Services 400.

User/Account Management 403

This is a client services component that allows the user to perform the following tasks:
- Create a new account
- Log into an existing account
- Use third party authentication (Google, Facebook, etc.)
- Delete an account and all users in it (account owner only)
- Create, view, update or delete a user from the account
- Display all users registered to this account
- View details for each user assigned to this account
- Assign privilege level per user on the account
- Set parental viewing settings on account users Store Interface 404

This is a client services component that allows the user to perform the following tasks:
- Browse the system's catalog to find products to rent or purchase
- Search for products by genre, title or other meaningful searching method
- Ability to search for products in a specific category
- Appropriate sub-filtering and sorting of the product list
- Be able to display more details about a specific product
- Access products in a series of formats (for Movies SD, HD and more)
- Pricing per product category
- Purchase media the users wants
- Locate Content Access Points near the users location
- Add products to a wishlist
- Link to help for the user
- Flexible architecture for easy store configuration from an administration dashboard
- No programming required for normal changes to the store content and configuration Device Management 405

This is a client services component that allows the user to perform the following tasks:
- Delete devices from the account
- View information about all the devices registered to the account
- Add a device to the account (only via Web API and via the Device Player itself)

Library Management 406

This is a client services component that allows the user to perform the following tasks:
- Display all licensed media (active rentals or purchased media) in the account
- Display rental/purchase history
- Identify expired media and remove from account
- Request owned/rental media to be downloaded to a specific device in the account
- Ability to stream media from the user account to a player Billing Management 407

This is a client services component which allows the user to perform the following tasks:
- Ability to create, view, update or delete a billing service option
- Display the billing options available
- Select a default billing option
- Display transaction history
- Ability to handle store transactions via the Store interface or via Web API calls
- Ability to utilize a variety of merchant gateways (e.g., PayPal, Google Cash, Square, Authorize.net, etc.)

Referring to FIG. 4, the following is a description of one embodiment of the Dedicated Web Services software modules in the Administrative Services 401. In one embodiment, administrative services include components that are used to manage the whole platform. Administrative services manage user accounts (e.g., users, libraries, devices, etc.), the remotely deployed Content Access Points (e.g., status, current catalogs, logs, etc.), the repositories, and analytics.

User/Account Administration 408

This is an administrative services component which performs the following tasks:
- All of the functions a user can do with their account
- Display all accounts in the system
- View details about a specific account
- View a list of all users in the system
- Flag user accounts for a variety of reasons
- Manage Product licenses owned by an account
- Manage Accounts, users, devices associated with accounts, account media library Store Management 409

This is an administrative services component which performs the following tasks:
- Manage the store's web interface for web clients
- Generate store recipes that can be stored, modified and used by the store
- Administrator creation of a new store interface without programming
- Access to metadata, catalogs, images, trailer, etc. for the store interface
- Billing transaction functionality for purchase or rental of media Device Management 410

This is an administrative services component which performs the following tasks:
- Remove devices from a user's account
- Default information about types of devices and those that are compatible
- View all devices in the system
- Craft analytics about device usage, by demographic, etc.
- Create, update or delete devices in the device repository Product Management 411

This is an administrative services component which performs the following tasks:

Main interface for managing the products database

Display all product in the system (with various sort capacity)

Create, update or delete products from the system

Manage Media Package associated with a product (Metadata, thumbnails, backdrops)

Sorting, filtering, etc. for products in the system

Update, create and delete supporting data used by the main product data tables

Handle image, video, etc. file management for a specific product

Content Access Point Management 412

This is an administrative services component which performs the following tasks:

Main interface for managing all the Content Access Points installed

Track when the last time a Content Access Point has checked in

Track transaction statistics per Content Access Point (Logins, browse, purchase, rentals, downloads, etc.)

Interface for updating to Content Access Points software (provisioning)

Manifests and catalogs for Content Access Points

Track Content Access Points uptime

Analytics Engine 413

This is an administrative services component which performs the following tasks:

Analyze transaction statistics

Analyze user demographics, browse history, etc.

Analyze device usage

DRM Server 414

This is an administrative services component which performs the following tasks:

Backend DRM security of Media content

Individualization of client devices

Provided via third party (e.g., Widevine, PlayReady, etc.)

Cloud APIs 415

This is an administrative services component which performs the following tasks:

Client APIs for Client Services functionality

Content Access Point APIs for Content Access Point management

Client APIs for Client transaction services

Referring to FIG. 4, the following is a description of software modules in the Repositories 402 in one embodiment of the Dedicated Web Services x. This section provides components which are used to store data and manage it before business usage transformation.

Accounts 416

This is a repository component which performs the following tasks:

Storage for all accounts within the system

ORM access to account information

Users 417

This is a repository component which performs the following tasks:

Storage for all the users and accounts within the system

ORM access to all user and account information

Devices 418

This is a repository component which performs the following tasks:

Storage for all the devices within the system

Default device graphic and info stored for each device type in the Device Repository Default device for each type available ORM access to the device information Products 419

This is a repository component which performs the following tasks:

Storage for all the products within the system

Store pertinent data about products (images, metadata, etc.)

Will store links to supporting images, trailers and the actual videos

Content Access Points 420

This is a repository component which performs the following tasks:

Store statistics about each Content Access Point

Store each Content Access Point's credentials

Location information about each Content Access Point

Dedicated Web Services Repository Detailed Description

This section discusses the details of the data collected, i.e., the database schema, and used within Dedicated Web Services.

| Data Name | Purpose |
| --- | --- |
| First Name | Users name. Identification and used with billing. |
| Last Name | Users name. Identification and used with billing. |
| Email Address | Send receipts to for purchases and rentals |
| Login Name | Authentication credentials |
| Password | Authentication credentials |

User Information

| Data Name | Purpose |
| --- | --- |
| Billing Type | PayPal, Authorize.net, Credit Card, etc. |
| Card Type | Visa, MC, AMEX, etc. |
| Card Number | Credit card number |
| Security Code | Credit card security code |
| Expiration Date | Expiration date |
| Street Address | Security verification |
| City | Security verification |
| State | Security verification |
| Zip code | Security verification |
| ??? | Will need additional information based on different payment options (e.g., Paypal, etc.) |

Billing Information

| Data Name | Purpose |
| --- | --- |
| Account Name | To label the account |
| User List | Collection of users (ex 1-6 per account) |
| Device List | Collection of users (ex 1-12 per account) |
| Library | List of content owned by the account |
| Transaction History | History of transactions on this account |

Account Information

| Data Name | | Purpose |
| --- | --- | --- |
| Phones | IMEI, ESN, etc. | Device unique identifier (individualization) |
| | Model # | To reference the Device Database |

-continued

| | Data Name | Purpose |
|---|---|---|
| | WI-FI Mac | Uniquely identify device, all devices using our system will need WI-FI |
| | OS Version | Tracking purposes |
| | Android ID | Uniquely identify the Android device |

Device Information

| | Data Name | Purpose |
|---|---|---|
| Tablet | Serial # | Uniquely identify the device |
| | Android ID | Uniquely identify the Android device |
| | WI-FI Mac | Uniquely identify device, all devices using our system will need WI-FI |
| | OS Version | Tracking purposes |
| Movies | Title | Display, Sorting and searching options |
| | Rating | Display, Sorting and searching options as well as Parental guidance |
| | Genre | Display, Sorting and searching options |
| | Running Time | Display purposes |
| | Release Date | Display, Sorting and searching options |
| | Rental Price | Cost of movie rental (SD, HD, HDX and UHD) |
| | Purchase Price | Cost to purchase movie (SD, HD, HDX and UHD) |
| | Actors | Display Purposes |
| | Directors | Display Purposes |
| | File Size | Validate there is room on device and display purposes (SD, HD, HDX and UHD) |
| | Description | Display Purposes |
| | Release Date | Display, Sorting and searching options |

Product Information

| | Data Name | Purpose |
|---|---|---|
| TV Series | Series Name | Display, Sorting and searching options |
| | Season Name | Display, Sorting and searching options |
| | Season Price | Cost for the whole season |
| | Description | Display purposes |
| | Episode List | Selection options |
| TV Series Episodes | Title | Display, Sorting and searching options |
| | Rating | Display, Sorting and searching options |
| | Genre | Display, Sorting and searching options |
| | Running Time | Display purposes |
| | Rental Price | Cost of movie rental |
| | Purchase Price | Cost to purchase episode |
| | File Size HD | Validate there is room on device and display purposes |
| | File Size SD | Validate there is room on device and display purposes |
| | Description | Display Purposes |
| | Release Date | Display, Sorting and searching options |

Dedicated Web Services Design Details

The section covers design details of the components in one embodiment of the Content Delivery System.

General Design

In one embodiment, this component of Content Delivery System provides the user facing application for browsing, acquiring and playing DRM Media Content on a wide variety of mobile platforms.

Both the client store front and the administration dashboard have the following characteristics:
  Mobile-first design
  A minimum of four media query transition points
  Handle landscape and portrait modes on devices
  Includes responsive images and SVGs where possible
  Responsive typography
  All web portals have a minimum of a header and a footer that is the same for all content pages
  Hover over affects for desktop/laptop users
  Video/Image handling
  Small static images are encoded and bundled with the HTML
  Larger images are compressed and resized to reduce the size while retaining quality
  Larger or dynamic images reside behind a CDN
  Trailers and non-encrypted video reside behind a CDN
  All images and videos need to have appropriate licensing
  All images have alternative text
  Front end sources
  All front end sources are bundled
  Bundling is split between vendor (e.g., Bootrstrap, etc.) and site specific sources
  Styles and scripts are not be bundled together (styles load first then scripts to decrease load time)
  All sources is minified
  All Javascript is uglified
  The site is designed for the US, other countries will fall under a localization project
  Flavicon icon is at the root for browser tab icon branding
  All text is proofread and grammar checked
  Copyright text with appropriate year must be in the footer
  Site runs on HTTPS
  Custom error page (e.g., 404, etc.)
Client Service This section describes the design and workflow of the client side services for one embodiment of the Client.

Note: when credit card information is stored, it is PCI compliant. Recommend third party billing as this are generally be one of the requirements by partners.

Content Delivery System Store Interface

This page is divided into 4 main chunks:
  Menu Header
  Jumbo Hero Carousel
  Main Content
  Footer This page is modeled after Amazon Prime Video home page.

Header

Header has a top-level page links of the most used pages to include:
  Product Specific or Filtered Pages (such as, for example, Movies, TV Shows, or filters like Kids)
  Content Access Point Locator
  Search
  Library
  Wishlist
  Settings
  Help
  Log In/Log Out
Footer Footer has links to the following pages:
  Company Page (About Us, Contact Us)
  Terms of Use
  Privacy Notice
  Any other legal pages
Jumbo Hero Carousel This section has a number of promotions of the current cycle. In one embodiment, each Hero Image has links to a product detail page, promotional page or whatever it is linked to from the Administration Dashboard. In one embodiment, the carousel is configurable (e.g., no less than four hero images, no more than eight hero images, etc.). In one embodiment, configurability of the store hero carousel is set in the administrative dashboard.

Main Content Section

This section has a series of custom carousel bars according to one embodiment. Each carousel bar has a number of banner thumbnails, a control title and an option link to a more specific page filtered based on the filter for the carousel bar.

Carousel bars are:

Standard banner thumbnail carousel with header and optional deep link

In one embodiment, an optional configuration includes:

Small square thumbnails with header and optional deep link

Full length banners

Different size banner bars that fit in the responsive framework

An object of different carousel bar configurations is to draw the attention of the customer to something different. The banner thumbnail bar is created first as the standard. In one embodiment, the number of carousel bars is configurable via the administrative dashboard as well as the content within each bar. All tiles within a carousel bar has popover modal dialogs giving a little more detail where it makes sense. All tiles within a carousel bar has links to either product detail pages or whatever was linked to via the administrative dashboard Product Specific/Filtered Pages (such as Movies, TV Shows, or filters like Kids)

In one embodiment, product specific or product filtered pages have the same interface as the Store Interface home page. These pages are configurable from the Administration Dashboard in the same way as the Store Home page.

In one embodiment, these pages are filtered by:

Product Type (Movies, TV Shows)

Filters (Such as content for Kids)

Further filtered pages, such as picking a "see more" link or a genre thumbnail creates a thumbnail or banner thumbnail grid page without the Hero Carousel. The top-level pages are limited similar to how Amazon Prime does theirs. The further filtered pages work more similar to how Vudu does filtered pages. These pages are modeled after Amazon Prime Top Level Filtered pages.

Content Access Point Locator

In one embodiment, Content Access Point locater page is similar to Redbox's "Find a Box" page. It starts with a modal dialog that request either the user zip code or a "Find Near Me" option which use HTML 5 Geolocation tools to locate where the user is. Once either is initiated, a Content Access Point Locator Page appear.

In one embodiment, the page consists of the following components:

Map (Google, Bing or otherwise) with custom Content Access Point icon

Browse by zip code box

A list of Content Access Points

Address

Distance from the user location

Browse Product button (to browse what is currently loaded on the specific Content Access Point)

Get Directions link (moved to Map page, Bing, Google or other)

Ability to add to the user's favorite Content Access Points

Search

In one embodiment, this component is similar to Redbox's search component and provides filtered search results into a dialog modal and will not leave the current page. In one embodiment, results are returned via an Ajax call to a backend Search end point, and a search only return product titles, but can take in partial titles, actor's names, director's names. A link is provided to a Product Details page behind the name returned.

Library

The library page has a grid of user content. It has top level filters for types of products. It has secondary filters on the right for sorting purposes. This page is similar to Amazon Prime's Video Library Page.

Wishlist

The wishlist page have a grid of user content added to the user wishlist. It has top level filters for types of products. It has secondary filters on the right for sorting purposes. Thumbnails have links to Product Details pages and purchase options. Thumbnails have the same popover modals that the store interface has. This page is similar to Amazon Prime's Your Watchlist Page.

Settings

The section discusses the different user portal settings that the user can manage in the Client Services part of Dedicated Web Services. The areas covered here are:

Account Settings

User Settings

Device Settings

Billing Management

Purchase History

One goal is to have an account, which has the account library associated with it. An account can have a number of users, one being primary. It can also have a number of devices. An example would be an account with six users and 12 devices which follows similarly to what Ultraviolet had devised. This can be defined during setup of the system for a partner.

Account Settings

The account settings page has the following (viewable based on user permissions):

Name Field

List of users

List of devices

Button to add a User

Button to Add a Device

Accounts country (US only for this version, add this functionality later)

Page is similar to the way Ultraviolet use to do this.

User Settings

The user settings le

Last Name

Email address

User Name

User Password

User Type

Date of Birth (optional)

User can be of three different types:

Primary—Account owner

Standard

Limited

Limited User has the ability to:

Search content in the library

Request content to be sent to a device

View content details (in the store or the library)

Watch Trailer

This user does not have purchase authority

Standard Users has the ability to:

Do everything a Limited User can

Purchase content

View the user list

View the device list

Primary User has the ability to:
Do everything a Standard User can
Edit he Account Name
Add/Edit or Remove users
Add or Remove devices
Change the parental controls of a user
Define the accounts country (US only for this version, add this functionality later)
Add/Edit or Remove billing options to the account
Close the Account
Page is similar to the way Ultraviolet use to do this.
Device Settings
The user settings page has the following (viewable based on user permissions):
List of Devices in the account
Button to Add a Device
Add device button (with a code that the user enters in the device)
Button next to the device to remove it if desired
Page is similar to the way Ultraviolet use to do this. Amazon and Vudu have similar pages.
Billing Management
The billing management page has (modeled similar to Vudu):
List of payment options
Button to mark option as default
Button to add a payment option (standard or third party (Paypal))
Standard Debit/Credit Payment option collects:
Billing street address
City
State
Zip Code
Name on Card
Card Number
Expiration Date
CVC
Third Party payment systems have different mechanisms for linking into a Web App. Each is addressed as needed.
Page is similar to the way Ultraviolet use to do this.
Purchase History
The purchase history page has:
List of products purchased
List of products rented
Date transaction occurred
Date rental was finished (rental only)
Name of user who made the transaction
Sort and filter functionality that makes sense (by user, date, year, etc.)
Ratings block (1 to 5 stars)
Help
This page has links to man other pages and/or have expanding help options based on the amount of help information new provide.
Log In/Log Out
This is a basic login page. It consists of the following basic information:
User Name
Password
Links to conditions of Use and privacy notice
Sign In button
Link to create in if the user needs to make an account
Log off does not have a specific page or modal. Just a link to log off with in the top corner of the store interface page Product Details
The product details page has the following listed (Movies):
Product Title
Star Rating (User Review system)
Ratings (IMDb, Rotten Tomatoes, etc.)
Running Time (in minutes)
MPAA Rating (for movies)
Short description
Genre list
Director
Main Actor (3 or less)
Purchase and Rental button (button drop downs by format like Vudu)
Add to Wishlist button
Watch Trailer button
Link to Terms of Use
Social media share links for products
Related content thumbnail list
Details Block
Genres
Director
Starring
Supporting Actors
Studio
MPAA Rating
Captions and Subtitles (May add later)
Audio (May add alter)
Formats
Release Date
The product details page has the following listed:
Product Title
Star Rating (User Review system)
Ratings (IMDb, Rotten Tomatoes, etc.,)
Season Year
Number of Seasons
TV Ratings
Short description of Season
Genre list
Purchase and Rental button block (for season, similar block with each episode listed later)
Add Season to Wishlist button
Watch Trailer button (Maybe)
Link to Terms of Use
Social media share links for products
Episode List
Episode Number
Title
Short episode description
TV Rating
Run Time
Release Date
Purchase/Rental Button block per Episode
Related content thumbnail list
Season Details Block
Genres
Director
Season Release Date
Network
Producers
Formats
This page is similar to Amazon Prime Video's Product Details page (with parts from Vudu).
Purchase Page
In one embodiment, the purchase page is shown either from a link from the product details page or from the model in the store interface.
In one embodiment, the store front does not have a cart and a purchase is made one at a time as hard copy products are not reserved in an inventory system. In one embodiment, the user is just purchasing a license to view to content on devices registered to the account the user is in and the license is stored in the account's library. In one embodiment, the purchase page does not show up if the user is not logged in or the user does not have billing information associated with the account.

Much of the checkout process is similar to Vudu. In one embodiment, the purchase are two-phase commit. Two-phase commits limit accidental purchases, though it does add a step to the purchase process.

The purchase page shows the following:
Item the user is purchasing (thumbnail, title, content created date)
  Type of purchase: rent or buy
  Format of Product: SD, HD, etc.
  Price
  Tax
  Total
  Default billing option (e.g., PayPal, etc.)
  Purchase button
  This page is modeled after Vudu's checkout page.
Create Account Page This is a basic create an account page. It consists of the following basic information:
  User Name
  Email Address
  Password
  Password (re-entry)
  Links to conditions of Use and privacy notice
  Create button
  Link to sign in if the user already has an account
Company Page (About Us, Contact Us)

This page or modal contains the company info, contact information and anything else the company would like to add in this section. In one embodiment, structure and composition is defined by executive staff.
Terms of Use This page or modal consist of the terms of use for the content. Contents of this page and format are generated by legal.
Privacy Notice This page or modal consist of the privacy notice for the system. Contents of this page and format are generated by legal.
Content Delivery System Administrative Services This component of Content Delivery System provides the user facing application for browsing, acquiring and playing DRM Media Content on a wide variety of mobile platforms. In one embodiment, most actions in the system create a transaction log indicating the action performed and who performed it (hence an audit capacity). No user, administrator, or otherwise may delete anything form the audit tables. Audits can only be archived.
Content Delivery System Administrative Dashboard
  This page are divided into 4 main chunks:
  Top Menu Header
  Side Menu Bar
  Main Content
  Footer
Header Header consists of top-level page links of the most used pages to include:
  Log In/Log Out
  Button for side menu collapse/expand
  Title
  Help
Side Menu Bar This is the primary menu for the dashboard system. It contains links to the following pages:
  Header (containing profile picture)
  Products (Movies, Bundles, TV Series, TV Seasons, TV Episodes, etc.)
  Product Support Data
  Account Management (Accounts, Users, Devices, Libraries)
  Device Management
  Content Access Point Management
  Store Configuration Management
  Administrative Management
  Analytics
  System Settings
  Each of these menu items has additional submenus either within the side menu or within the content area for its page.
Main Content Section This section is the holder for the content for all the other pages in the dashboard system. Each content page is self-contained and provide the functionality it needs to perform the tasks that related to the page's content. Some pages may contain sub-menu header bars that is restricted to the content area of the page.
Footer
  Footer contains the following links to the following pages:
  Company Page (About Us, Contact Us)
  Terms of Use
  Privacy Notice
  Any other legal pages
Products Pages The menu item is basically a holder for the submenu pages for different products listed below:
  Products
  Movies
  Bundles
  TV Series
  TV Seasons
  TV Episodes
  All pages in this category have the following abilities:
  List of products with appropriate details
  View an individual product's detail
  Create a new product with all its details (metadata, thumbnails, etc.)
  Edit an individual product's detail
  Delete an product (deletion just moves product to an inactive status)
  Filter and sort all products
  Search for a specific product
Products This page includes a complete list of products in the system. Products are defined by a type (such as Movie) and a format (such as SD). Products can have individual prices attached to them, hence each format can be set to a different price based on the partner's or content owner's requirements.
  Products include the following:
  A product type (movies, etc.)
  A link to a specific item (movie title, or a collection such as a movie series or other bundle)
  Formats available
  Prices per format (may all be the same price)
Movies This page handles the movie Products. It provides the ability to add to movies to the system. It contains the functionality previously listed in the Products Main section.

Movies have the following:
Metadata about the movie (text)
Image Links (thumbnails, backgrounds, banners, etc.)
Trailer Links
Video Links (for where the encrypted media is stored by format)
Bundles
This page handles the Bundles. A Bundle is nothing more than multiple movies bundles together, such as the whole Star Wars series, etc. Bundles can only be created with content already in the system. A Bundle is a product and potentially has different pricing than the individual items sold separately.
TV Series
This page handles the TV Series. A TV Series is generally not sold as a product. It contains the high-level information about a TV Series. Seasons and episodes contain the more detailed information about each. If a whole series is sold (such as a series which is no longer releasing new episodes, like Friends), it is treated as a very large Bundle, but is created in this category.
TV Seasons
This page handles the TV Seasons. A TV Season is can be sold as a bundle of episodes (and normally is), but episodes can be sold separately with individual pricing.
TV Episodes
This page is where specific episodes are created. At the heart of a TV Series are the individual episodes. Each are added to a specific Season of a specific Series.
Note: about TV products. They are created in the following order: series, season, and then episode. The episode screen has dropdown menus to associate a new episode with a specific season of a series.
Product Support Data
This menu item contains a number of other product support pages to add data to. Everything from MPAA Ratings to Actors names are in this section. There is currently not an exhaustive list at the moment, but new items are added to this section as needed.
Each of the specific pieces of support data page has the following functionality:
List all the items in a specific support data category (such as a genre list)
Create a new item
Edit a current item
Delete an item (only if item is not in use)
Account Management
The Account Management pages are here to allow the administrator the ability to manage user accounts within the system. Accounts are a collection of users, devices and an associated library.
Admins has the ability to do the following:
Do most of the changes any user can do to their own account except purchase products
Full CRUD (create, read, update, delete) an account
Full CRUD (create, read, update, delete) users within an account
Full CRUD (create, read, update, delete) devices within an account
Full CRUD (create, read, update, delete) content within an account library
Admins can suspend accounts (and all users and devices attached)
Device Management
This section deals with one embodiment of the device repository and the detailed data about every type of supported device.
Content Access Point Management
The Content Access Point Management pages allow the administrator the ability to manage remote Content Access Points. These pages allow catalog creation and assignment. These pages also provide the ability to provision a new version of the Content Access Point software to the Content Access Point.
Catalog Management
The Catalog Management page allows the creation of product catalogs to be stored in a Content Access Point. These product catalogs consist of the following:
Media package for each product
Metadata about each product
Links to the trailer
Links to the images (thumbnails, banners, etc.)
Links to the encrypted data
Provisioning
The Provisioning page allows a way for Content Access Points to update themselves once deployed. Once a new installation package is available, this page provides a means of defining how to deploy the package. The deployment is defined via a manifest similar to the catalog manifests. A provisioning manifest contains a link to the package and a list of Content Access Points to provision. This gives the ability of the admin to selectively upgrade Content Access Points for testing purposes.
Store Configuration Management
The Store Configuration Management page allows the creation of store configurations that can be set as active for the Dedicated Web Services Store interface. These configurations consist of the following:
Configuration name
Count of hero images
List of links to the hero images
Count of carousel bars
Carousel configuration list
Title of carousel bar
Type of carousel bar (standard, small-square, etc.)
List of products to be displayed via the carousel bar
Whether or not the carousel bar has a "more" button and the link to the "more" page
In one embodiment, configurations can be stored and reused. Only one can be set as active at a time
Administrative Management
The Administrative Management page allows the creation admin accounts. As these are different than user accounts, more details are involved. Based on our partner requirements, this function may link into a partner's HR system for data for these pages.
Admin pages contain normal employee contact information, image avatar, etc. This page has standard CRUD capabilities that most of the dashboard pages contain.
Analytics
The Analytic pages allows the admins to view the current analytic state Dedicated Web Services, the Content Access Point Network as well as the Clients deployed to the user base.
The Analytics Engine is described in a separate specification, though all analytics evaluation will come from these pages. Initially, Firebase is used for analytics gathering as it currently has functionality for all our platforms
System Settings
The System Settings page allows the ability to set settings for the global platform. Some of these may be as simple as theme per user others may affect the system as a whole such as Users per account. Some settings may only be available during setup as changing the users per account while in operation can have drastic impact on a system in use. All settings for the Dedicated Web Services and the System in general is accessed from here.

Security

This section discusses the security of the Admin Services portion of Dedicated Web Services. Web authentication is handled by Firebase for an industrial strength authentication solution out of the box with a variety of log in features and built in analytics backing log in and log out services. Content is encoded and secured before placed into our management system. Access to content and storage from the Admin Dashboard is restricted to those with access to the Admin Dashboard.

Web APIs (Client and Content Access Point)

This component of invention provides APIs that Clients and the Content Access Points use to communicate with Dedicated Web Services.

Requirements are defined later once Client and Content Access Point LLDs are done Dedicated Web Services Configuration The section covers the details of how the Dedicated Web Services layer is configured in the Cloud.

General Configuration

Below is a discussion the details of folder structure and storage of content and media within our system.

GZip on the hosting site needs to be turned on

CDN Hosting

At some point, the static components may be move to a CDN for responsiveness. These include:
  Images
  Style sheets
  Script libraries
  Trailers Additional Components The section lists other embodiments and components that are supported, or in support, of the software described above.

Content Access Point Streaming—provides localized streaming of encrypted media content at the Content Access Point location. The client, while maintaining proximity to the Content Access Point, can continuously stream content with traditional stream technology.

Windows Device Support—supports the Universal Windows System including a host of clients from laptops, tablets, phones, Xbox, HoloLens, etc.

OSX Support—provides an OSX client via the Mac App Store for Apple computers.

Game Console Support—supports streaming and local download of media content to game consoles such as Xbox 360, Xbox One, PS3 and PS4.

Smart TV and Media Device Support—supports streaming and local download of media content to media devices such as: Roku, Apple TV, Amazon TV, Chromecast, etc. Also support Google TVs and other brands of Smart TVs Homespot—provides both a client and a store interface directly to a user's home. It supports streaming to devices, as well as downloading directly from its local cache to devices in the home.

Hubserver—provides an intermediate cache server would service a collection of Content Access Points in an area, such as a mall, airport, etc. The Hubserver would provide a single point of updating all of the catalogs, media, etc. of all of the Content Access Points in its collection. Can server a single point for updating the Content Access Point software as well as content. Can serve as a single collection po9int of analytics for a collection of Content Access Points.

MoviesOnFlash—provides the ability to distribute secure content via flash drives. Content would still only be able to be played by Compatible players.

Dedicated Web Services Store—A full web-based store for purchasing and downloading DRM media content. The majority of the components necessary to deploy the Content Access Point will also support and online store presence.

Dedicated Web Services Streaming Content—streaming directly from Dedicated Web Services via traditional streaming technology.

Alternative Clients—support for client devices such as mobile devices running Android and iOS; media devices such as Amazon Kindle, Windows mobile devices; set-top devices such as Roku, Amazon Fire TV, Neo TV, Apple TV; and gaming consoles such as Xbox One X, Xbox One, PS3, PS4.

Example Communication between a Content Access Point and a Client App

For illustration purposes, this is an example of a communication session between a Content Access Point and a Client App for some embodiments. Furthermore, some of the steps in this example are not required for all embodiments. Finally, it is possible for a single Content Access Point to have different interactions with different Client Apps depending on the specific embodiments of the Client App. For instance, the Client Apps may be embedded in the proprietary applications of different companies and still use the same Content Access Point (e.g., a Netflix app and a Hulu app may use the same Content Access Point). Client Apps can be different versions or require different types of authentication. There may be different protocols for connection (e.g., other than Wi-Fi) and different methods of authentication.

In this example, the user launches the Client App 510. The Client App stores information about the existing Wi-Fi connection 511 for reconnection at the end of the session. Then the Client App searches Content Access Point SSID 501 broadcast by a Content Access Point 500. In one embodiment, the SSID is not broadcast and the Client App attempts to connect blindly. When the SSID is detected by the Client App 512, the Client App connects and sends password information 513 (if necessary). The Client App then requests a session authorization and ID 514 from the Content Access Point 500. If the authentication is valid, as determined by the Content Access Point, a session ID is passed back to the Client App 514.

Now with this session ID, the Client App can perform any or all of the operations allowed. This may include, but is not limited to, browsing content on the Content Access Point or web servers (if available), transacting content purchases or acquisitions on the Content Access Point or web service (if available), or other functions. One primary function, however, is to request content 515 and receive data 503. The Client App also posts (uploads) analytic data 516 to the Content Access Point analytic store 504. The analytic data is all the analytics captured since the last time the Client App connected with a Content Access Point or web service.

At the conclusion of the transaction, content download, and analytic data transfer the Client App ends the session and drops the connection with the Content Access Point 517. Then the app reconnects with the previous existing network connection 518, if any.

Figure 6:
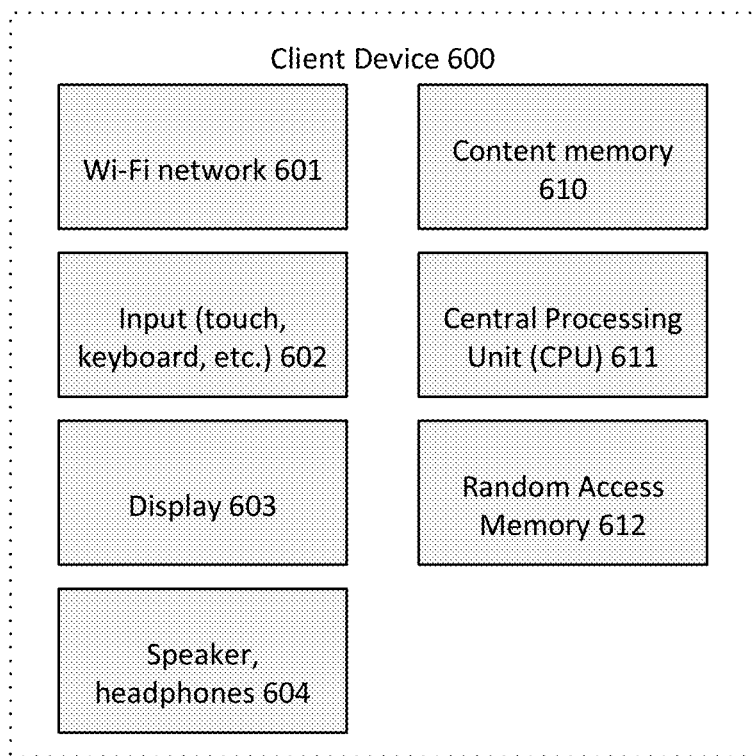
FIG. 6 is a block diagram of one embodiment of a Client Device.

FIG. 6 is a block diagram of one embodiment of a Client Device. Examples of common Client Devices includes but are not limited to laptop computers, smart phones, and tablets. Note that the essential hardware elements are shown in FIG. 6 and the Client Device includes other components and features that are not shown to avoid obscuring the present invention. Wi-Fi network connection 601 connects to a Wi-Fi network to enable a wireless connection to the Content Access Point. Input 602 comprises user input device to enable user control. Display 603 is used to display content. Speaker 604 is used to provide audio content. Content memory 610 is usually non-volatile memory such as, for example, a flash memory or magnetic memory and is used to store the downloaded content. CPU 611 controls components of the Client Device, including running the Client App and random access memory (RAM) 612 is a memory used for running the Client App.

Figure 7:
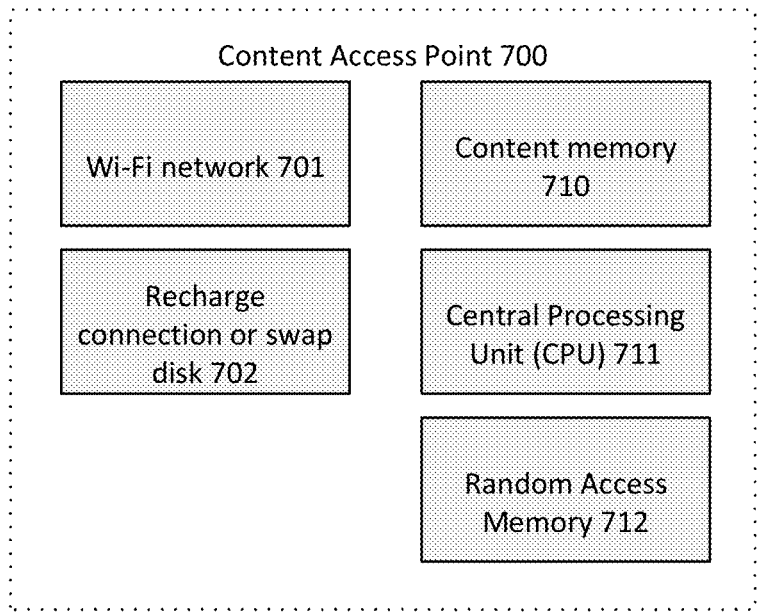
FIG. 7 is a hardware block diagram of one embodiment of a Content Access Point.

FIG. 7 is a block diagram of one embodiment of a Content Access Point. Examples include off-the-shelf Wi-Fi access points connected to a computer with large storage for content. Note that the essential hardware elements are shown in FIG. 7 and the Content Access Point includes other components and features that are not shown to avoid obscuring the present invention. Referring to FIG. 7, Wi-Fi network 701 is used to connect to the Client Device. Recharge connection 702 is used to swap out the content and upload any Client Device analytics. In one embodiment, recharge connection 702 is a wired or wireless connection to a server or the Internet. In one embodiment, recharge connection 702 is a wired or wireless connection to a mobile device with the content in memory. In one embodiment, recharge connection 702 is a physical unit (e.g., disk or flash memory, etc.) that is swapped to perform the recharging function.

Content memory 710 is usually non-volatile memory such as, for example, but not limited to, flash memory or magnetic memory and is used to store the content. CPU 711 runs the Content Access Point software and control the Content Access Point. RAM 712 is used by CPU 711 for running the Content Access Point software.

The invention claimed is:

1. A content delivery platform comprising:
one or more client devices, each of the one or more client devices having memory for storing an application and one or more processors to execute the application, wherein at least one of the one or more client devices is connected to a network device using a first network connection; and
a first access point having a service set identifier and a physically local content cache associated with the service set identifier to store content to be served directly to the one or more client devices, the at least one of the one or more client devices, in response to executing the application with the one or more processors, operable to:
automatically store the first network connection in the memory;
automatically search for the service set identifier of the first access point in response to said store,
automatically detect the service set identifier of the first access point based on searching;
automatically connect and send password information to the first access point in response to detecting the service set identifier;
request content from the first access point based on the service set identifier and the password information;
receive the content from the first access point; and
disconnect from the first access point and reconnect with the network device using the first network connection after receiving the content from the first access point.

2. The content delivery platform of claim 1 wherein the first access point to deliver the content without a network connection between the first access point and a remote source of the content.

3. The content delivery platform of claim 1 wherein the first access point is configured to receive the content from a swappable memory device swapped into the first access point, and analytic data obtained from at least one of the one or more client devices is stored into the swappable memory device when coupled to the first access point.

4. The content delivery platform of claim 1 wherein the content is delivered, via networking with a mobile content recharging device, to the first access point and analytic data from at least one of the one or more client devices is transferred to the mobile content recharging device.

5. The content delivery platform of claim 1 wherein the content is delivered, via an Internet connection, to the first access point and analytic data from at least one of the one or more client devices is transferred from the first access point to a remote location via the Internet connection.

6. The content delivery platform of claim 5 wherein delivery of the content to the first access point and sending of the analytic data from the first access point occurs during off-peak bandwidth demand.

7. The content delivery platform of claim 1 wherein the first access point is operable to authenticate the at least one of the one or more client devices without Internet access and intermediation, the one or more client devices being operable to browse, request, and have delivered the content from the first access point without Internet cloud authentication.

8. The content delivery platform of claim 1 wherein the first device is configured to upload transaction and analytic data automatically from the one or more client devices upon connection to each of the one or more client devices, and wherein the first access point is configured to upload the transaction and analytic data to a remote location via its content delivery method.

9. The content delivery platform of claim 1 wherein at least one of the one or more client devices is operable to upload analytic data to the first access point, and the first access point is configured to transfer the analytic data to a remote location.

10. A method for content delivery comprising:
executing, by each of one or more client devices using one or more processors, an application, wherein at least one of the one or more client devices is connected to a network device using a first network connection,
automatically storing, by the at least one of the one or more client devices, the first network connection in a memory;
automatically searching, by the at least one of the one or more client devices, for a service set identifier of a first access point having a physically local content cache associated with the service set identifier to store content to be served directly to the one or more client devices, in response to storing,
automatically detecting, by the at least one of the one or more client devices, the service set identifier of the first access point based on searching;
automatically connecting and sending password information, by the at least one of the one or more client devices, to the first access point in response to detecting the service set identifier;
requesting content from the first access point by the at least one of the one or more client devices based on the service set identifier and the password information;

receiving, by the at least one of the one or more client devices, the content from the first access point; and disconnecting, by the at least one of the one or more client devices, from the first access point and reconnecting, by the at least one of the one or more client devices, with the network device using the first network connection after receiving the content from the first access point.

11. The method of claim 10 further comprising delivering, by the first access point, the content the at least one of the one or more client devices without a network connection between the first access point and a remote source of the content.

12. The method of claim 11 further comprising receiving, by the first access point, the content from a swappable memory device swapped into the first access point prior to delivering the content to the at least one of the one or more client devices, and transferring analytic data obtained from at least one of the one or more client devices to the swappable memory device when coupled to the first access point.

13. The method of claim 11 wherein the content is delivered, via networking with a mobile content recharging device, to the first access point and analytic data from at least one of the one or more client devices is transferred to the mobile content recharging device.

14. The method of claim 10 wherein the content is delivered, via an Internet connection, to the first access point and analytic data from at least one of the one or more client devices is transferred from the first access point to a remote location via the Internet connection.

15. The method of claim 14 wherein delivery of the content to the first access point and sending of the analytic data from the first access point occurs during off-peak bandwidth demand.

16. The method of claim 10 further comprising:
authenticating, by the first access point, the one or more client devices without Internet access and intermediation; and
the at least one client device browsing, requesting, and having delivered the content from the first access point without Internet cloud authentication.

17. The method of claim 10 further comprising:
uploading, by the first access point, transaction and analytic data automatically from the one or more client devices upon connection to each of the one or more client devices; and
uploading, by the first access point, the transaction and analytic data to a remote location via its content delivery method.

18. The method of claim 10 further comprising:
uploading, by at least one of the one or more client devices, analytic data to the first access point; and
transferring, by the first access point, the analytic data to a remote location.

19. One or more non-transitory computer readable storage media having instructions stored thereupon which, when executed by a system having at least a processor and a memory therein, cause the system to perform content deliver operations comprising:

executing, by each of one or more client devices using one or more processors, an application, wherein at least one of the one or more client devices is connected to a network device using a first network connection, automatically storing, by the at least one of the one or more client devices, the first network connection in a memory;

automatically searching, by the at least one of the one or more client devices, for a service set identifier of a first access point having a physically local content cache associated with the service set identifier to store content to be served directly to the one or more client devices, in response to storing;

automatically detecting, by the at least one of the one or more client devices, the service set identifier of the first access point based on searching;

automatically connecting and sending password information, by the at least one of the one or more client devices, to the first access point in response to detecting the service set identifier;

requesting content from the first access point by the at least one of the one or more client devices based on the service set identifier and the password information;

receiving, by the at least one of the one or more client devices, the content from the first access point; and disconnecting, by the at least one of the one or more client devices, from the first access point and reconnecting, by the at least one of the one or more client devices, with the network device using the first network connection after receiving the content from the first access point.

20. The storage media of claim 19 wherein the operations further comprise delivering, by the first access point, the content the at least one of the one or more client devices without a network connection between the first access point and a remote source of the content.

* * * * *